(12) United States Patent
Blank et al.

(10) Patent No.: US 11,374,430 B2
(45) Date of Patent: Jun. 28, 2022

(54) DEVICE FOR THE EMERGENCY SUPPLY OF A HIGH VOLTAGE ONBOARD NETWORK

(71) Applicant: LIEBHERR-WERK NENZING GMBH, Nenzing (AT)

(72) Inventors: Mathias Blank, Satteins (AT); Fabian Weber, Wangen (DE)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 0 days.

(21) Appl. No.: 17/112,825

(22) Filed: Dec. 4, 2020

(65) Prior Publication Data

US 2021/0175741 A1 Jun. 10, 2021

(30) Foreign Application Priority Data

Dec. 4, 2019 (DE) ...................... 10 2019 133 048.3

(51) Int. Cl.
*H02J 9/06* (2006.01)
*H01M 10/42* (2006.01)
(Continued)

(52) U.S. Cl.
CPC .............. *H02J 9/062* (2013.01); *B60R 16/03* (2013.01); *B66C 15/00* (2013.01); *E02F 9/24* (2013.01);
(Continued)

(58) Field of Classification Search
CPC . H02J 9/062; H02J 1/086; H02J 9/061; B60R 16/03; B66C 15/00; B66C 13/22;
(Continued)

(56) References Cited

U.S. PATENT DOCUMENTS

2003/0118876 A1* 6/2003 Sugiura ................... B60L 58/34
429/9
2012/0160796 A1* 6/2012 Weckbecker ............ B66D 1/12
212/284
(Continued)

FOREIGN PATENT DOCUMENTS

DE 4230593 A1 3/1994
DE 10108909 A1 9/2002
(Continued)

*Primary Examiner* — Toan T Vu
(74) *Attorney, Agent, or Firm* — McCoy Russell LLP (57) ABSTRACT

A device for emergency supply of a high voltage onboard network, in particular for the emergency load lowering of a work machine such as a crane or a cable excavator, comprising a high voltage onboard network having an electrical drive unit and a primary DC energy source for supplying the electrical drive unit with energy; a low voltage onboard network, preferably a 12 V, 24 V, or 48 V onboard network, having a low voltage rechargeable battery for taking up and outputting energy, wherein the high voltage onboard network and the low voltage onboard network are connected via a DC/DC converter to allow an energy flow from the high voltage onboard network in the direction of the low voltage onboard network. The DC/DC converter is preferably a bidirectional DC/DC converter to permit an energy flow from the low voltage onboard network in the direction of the high voltage onboard network.

20 Claims, 5 Drawing Sheets

(51) Int. Cl.
*H02M 3/04* (2006.01)
*H02M 7/537* (2006.01)
*B60R 16/03* (2006.01)
*B66C 15/00* (2006.01)
*E02F 9/24* (2006.01)

(52) U.S. Cl.
CPC ........... *H01M 10/425* (2013.01); *H02M 3/04* (2013.01); *H02M 7/537* (2013.01); *H01M 2220/10* (2013.01)

(58) Field of Classification Search
CPC ... E02F 9/24; E02F 3/46; E02F 9/2095; E02F 9/268; H01M 10/425; H01M 2220/10; H02M 3/04; H02M 7/537; H02M 1/007; H02M 3/00; H02M 7/5387; Y02E 60/10
See application file for complete search history.

(56) References Cited

U.S. PATENT DOCUMENTS

2019/0363406 A1* 11/2019 Yamada ............... H01M 10/441
2020/0395776 A1* 12/2020 Nedjimi ................ H02J 7/0013

FOREIGN PATENT DOCUMENTS

DE 102010007545 A1 8/2011
DE 102015007585 A1 12/2016

\* cited by examiner

DEVICE FOR THE EMERGENCY SUPPLY OF A HIGH VOLTAGE ONBOARD NETWORK

CROSS REFERENCE TO RELATED APPLICATION

The present application claims priority to German Patent Application No. 10 2019 133 048.3 filed on Dec. 4, 2019. The entire contents of the above-listed application is hereby incorporated by reference for all purposes.

TECHNICAL FIELD

The present disclosure relates to a device for the emergency supply of a high voltage onboard network, in particular of a work machine such as a crane or a cable excavator.

BACKGROUND AND SUMMARY

It is elementary for a plurality of work machines or vehicles to return to a safe state after a failure of their primary energy source. It is, for example, of great importance in a crane or a cable excavator also to reliably lower a raised load safely to the ground on a spontaneous failure of the primary energy source. The placing down of the boom in cranes with a boom adjustment winch can also be of great importance when a toppling of the machine is impending with a strong wind. It is customary for such an emergency lowering in accordance with the prior art to provide a backup energy supply or a sufficiently dimensioned rechargeable battery in the high voltage onboard network to carry out an emergency lowering. In accordance with the prior art, the crawler-mounted cranes and cable excavators are diesel-hydraulic machines in which it is customary to lower the load with the aid of a small hydraulic unit (generating set+hydraulic pump). In a number of cases, this emergency unit is not even part of the machine, but has to be brought in in the event of a problem and has to be connected to interfaces present at the device.

Electrically driven vehicles as a rule have two networks of different voltages, a high voltage onboard network and a low voltage onboard network. The high voltage onboard network is fed by the primary energy source and typically has a voltage between 60 V and 1.5 kV. As a rule in this high voltage onboard network there is also an electrical drive unit such as an electrical lifting mechanism or the like that is operated by means of the energy provided via the high voltage onboard network.

The low voltage onboard network is as a rule operated at a voltage that amounts to no more than 60 V and that serves to supply consumers that have a smaller power consumption, for example displays, radio, control, logic supply of components, or the like. The low voltage onboard network does not have its own energy source, but is rather connected to the high voltage onboard network via a DC/DC converter and obtains energy from the primary energy source arranged in the high voltage onboard network. It can, however, also be possible that the low voltage onboard network includes a backup battery (12 V or 24 V, lead acid battery, or Li-ion battery). This 24 volt battery supplies the low voltage onboard network with energy with a switched off high voltage onboard network. That is, the low voltage onboard network in this case has its own internal energy source via which the machine is typically first put into operation. Only when the control has ramped up and has worked through various tests is the high voltage supply switched in. This routine takes place in reverse order when switched off.

A method of operating a vehicle with an electric propulsion motor is known from DE 101 08 909 B4 that deals with the failure of the traction battery, that is of the primary energy source of a vehicle. To put such a vehicle into a safe state, the vehicle is regeneratively braked and other consumers are supplied with energy on a failure of the battery, in particular of the traction battery. The basic idea comprises converting the kinetic energy of a moving vehicle into electric energy. Other consumers such as a steering system can be fed by this until a standstill.

It is disadvantageous here that the kinetic energy available on the failure of the primary energy source is not large enough so that a safe state can be reached in certain situations. It is possible, for instance, that the energy required to carry out certain emergency actions is only available when a drive component moves sufficiently fast and thus has sufficient kinetic energy. An initiation of emergency actions from a standstill is not possible under certain circumstances.

It is the aim of the present disclosure to provide an emergency supply of a high voltage onboard network so that, for example, an emergency lowering of a load or of a piece of equipment of the crane or cable excavator can be performed despite a particularly resource-saving and slim basic design.

The present aims are achieved here by a device that has features of the described embodiments. Advantageous aspects of the device, according to various embodiments, are described in further detail herein.

The device in accordance with the present disclosure for the emergency supply of a high voltage onboard network, in particular for the emergency load lowering of a work machine such as a crane or cable excavator, accordingly comprises a high voltage onboard network having an electrical drive unit and a primary energy source for supplying the electrical drive unit with energy; a low voltage onboard network, preferably a 12 V onboard network, a 24 V onboard network, or a 48 V onboard network, having a low voltage rechargeable battery for taking up and outputting energy, wherein the high voltage onboard network and the low voltage onboard network are connected via a DC/DC converter to allow an energy flow from the high voltage onboard network in the direction of the low voltage onboard network. The device, in accordance with embodiments described herein, may be characterized in that the DC/DC converter is a bidirectional DC/DC converter to moreover permit an energy flow from the low voltage onboard network in the direction of the high voltage onboard network.

The basic idea of the present disclosure therefore comprises the linking of the high voltage onboard network and the low voltage onboard network by a bidirectional DC/DC converter that permits an energy flow both from the high voltage onboard network in the direction of the low voltage onboard network and in the other direction, that is from the low voltage onboard network in the direction of the high voltage onboard network. Due to the bidirectional DC/DC converter, a consumer arranged in the high voltage onboard network can be briefly supplied with energy from the low voltage rechargeable battery on a failure of the primary energy source to enable a move into a safe operating state.

Unlike the known prior art, it is not necessary to provide a separate backup solution in the high voltage onboard network since the energy stored in the low voltage onboard network of the rechargeable battery accommodated there can be made use of.

The low voltage rechargeable battery may comprise a standard rechargeable battery that is designed to take up or output energy at the low voltage. The rechargeable battery can be a lead acid battery or a lithium-ion battery.

The primary energy source can be a DC energy source in accordance with the present disclosure. The circumstance is also covered by the present disclosure that the energy source is a rechargeable battery and/or a generator operated by means of fuel that provides the high voltage to the high voltage onboard network. A fuel cell, a diesel unit having a rectifier, a gasoline-driven generator having a rectifier, and/or a high voltage battery are thus suitable as a primary energy source.

Provision can furthermore be made in accordance with the present disclosure that the device is adapted such that on a failure of the primary energy source in the high voltage onboard network, an emergency supply of the high voltage onboard network takes place by means of energy from the low voltage onboard network that comes from the low voltage battery via the bidirectional DC/DC converter.

Provision can be made in accordance with an optional further development of the present disclosure that the high voltage onboard network is an onboard network that works with a DC voltage in the range between 60 V to 1.5 kV and/or in a high voltage range.

Provision can be made in accordance with an optional further development of the present disclosure that the low voltage onboard network is an onboard network that works with a DC voltage of a maximum up to 60 V and preferably at 12 V, 24 V, or 48 V.

Provision is made in accordance with an optional modification of the present disclosure that an electrically or electrohydraulically actuable braking device is provided in the high voltage onboard network to brake an axle drivable by the electrical drive unit.

The axle drivable by means of the electrical drive unit can thus be a drive axle for a lifting mechanism of a crane or cable excavator that can be braked or stopped by the braking device. In this respect, the electrical braking device can be designed such that it is designed as self-closing, that is, for example, it changes into the braking state on a failure of the primary energy source. It can then be necessary for an emergency lowering to open the brake by means of the energy stored in the low voltage rechargeable battery so that the raised load can be safely placed down on the ground.

In accordance with a preferred embodiment of the present disclosure, a short-term energy store is furthermore provided in the high voltage onboard network, preferably in the form of a supercap or of an intermediate circuit capacitor to carry out a short-term energy buffering in the high voltage onboard network. Such a short-term energy store typically serves the smoothing of a provided, fluctuating voltage to provide consumers in the high voltage onboard network with an unchanging voltage level.

In accordance with an optional modification of the embodiments described, the device is adapted such that the DC/DC converter supplies the low voltage onboard network with energy from the high voltage onboard network in normal operation and, in emergency operation, that is present on a failure of the primary energy source, supplies the high voltage onboard network with energy from the low voltage rechargeable battery of the low voltage onboard network.

In accordance with a further optional modification, the device is adapted such that the low voltage rechargeable battery in normal operation supplies consumers that are arranged in the low voltage network with a switched off primary energy source and serves to buffer the low voltage onboard network with a switched in energy source and in emergency operation, with a failed primary energy source, both supplies any consumers arranged in the low voltage network and supplies the electrical drive unit in the high voltage onboard network and/or an electrically actuable braking device arranged in the high voltage onboard network with energy.

Provision can additionally be made in accordance with the present disclosure that the electrical drive unit comprises an inverter, in particular a four quadrant inverter, and an electric motor that is preferably connected to a transmission arrangement.

The electrical drive unit is preferably adapted to adopt a regenerative operating state in which the electrical drive unit does not drive, but is driven to feed energy into the high voltage onboard network. On the lowering of a raised load in the direction of the ground, for example, the drive unit can thus recover so that energy is generated that can be used for the maintenance of an opened brake state. The energy acquired from this from the lowering of the load can furthermore be fed back into the HV network to, for example, contribute to the controlled lowering of the load.

Provision can furthermore be made that a lifting mechanism of a crane or of a cable excavator is arranged in the high voltage onboard network that can be actuated by means of the electrical drive unit and can be blocked by means of an electrically actuable braking device likewise arranged in the high voltage onboard network.

Provision can preferably be made here that the electrically actuable braking device is an electrical or electrohydraulic holding brake for holding a load carried by the lifting mechanism in a stationary state and is to be supplied with energy via the high voltage onboard network for opening, with said holding brake preferably being self-closing and/or being an electromechanical holding brake.

The device is here preferably adapted to open the holding brake by means of energy from the low voltage rechargeable battery in emergency operation in which the primary energy source has failed so that the load carried by the lifting mechanism lowers, which has the effect under certain circumstances that the electrical drive unit adopts a regenerative operating state in which the low voltage rechargeable battery is supplied with energy or is charged.

The device is preferably also designed to close the holding brake by means of energy from the low voltage rechargeable battery in emergency operation and to stop the load carried by the lifting mechanism. It is, however, furthermore also possible that the holding brake closes independently. Energy is needed here to hold the holding brake open.

Provision can furthermore be made that the device is designed to supply the electrical drive unit with energy from the low voltage rechargeable battery in emergency operation when the primary energy source has failed to exert a holding torque or braking torque on the load carried by the lifting mechanism so that, for example, the load does not fall in an uncontrolled manner on an opening of the holding brake.

The device can therefore also be designed to supply the electrical drive unit with energy from the low voltage rechargeable battery in emergency operation to stop or hold the load carried by the lifting mechanism.

The present disclosure furthermore comprises a mobile work machine, in particular a crane or a cable excavator or a hydraulic cable excavator, having a device in accordance with one of the preceding variants.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Further features, details and advantages will become clear with reference to the following description of the Figures.

DETAILED DESCRIPTION

The following explanation of the basic idea of the present disclosure with reference to an emergency lowering should not be interpreted as restrictive, but rather only serves the exemplary illustration of an example from the wide range of applications of the present disclosure. It is clear to the skilled person that he can easily also use the basic idea of the present disclosure with application cases not related to cranes.

Figure 1:
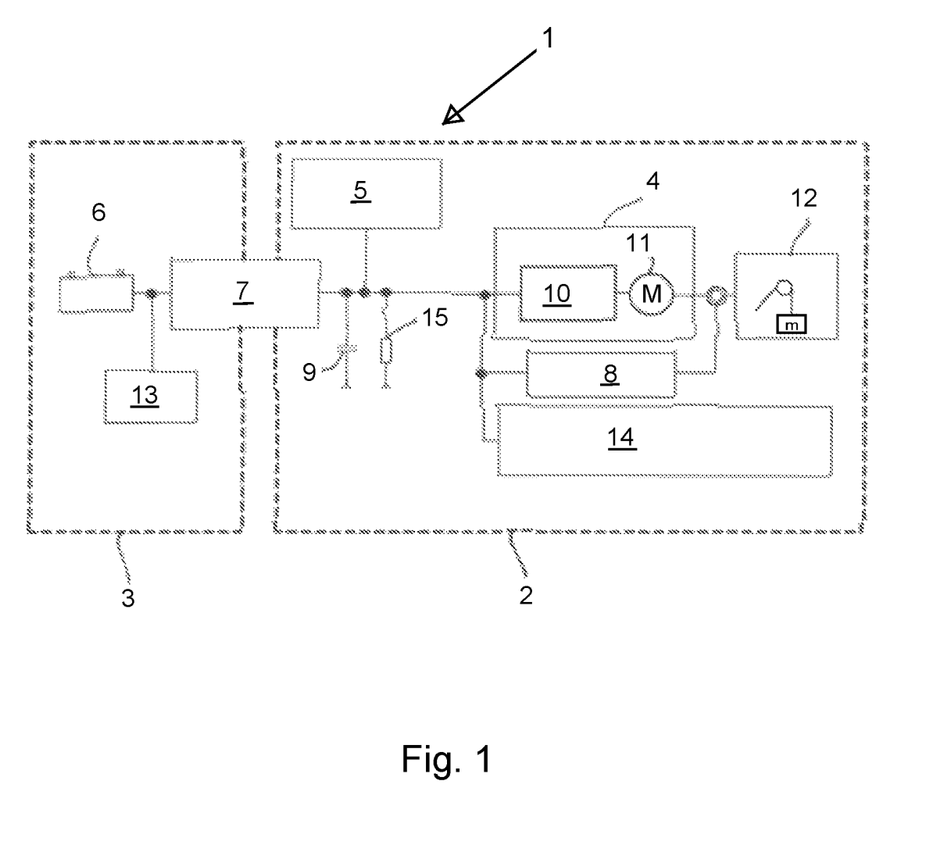
FIG. 1 is a schematic basic design of a device in accordance with the present disclosure.

FIG. 1 shows the schematic basic design in the implementation of the present disclosure for an emergency lowering of a crane or cable excavator. The device 1 comprises a high voltage onboard network 2 in which a plurality of components are arranged that are supplied with voltage from the high voltage range. The device 1 furthermore has a low voltage onboard network 3 that has components that are supplied with a voltage in the range up to 60 V. A typical value for the low voltage is 12 V, 24 V, or 48 V, whereas voltages in the high voltage range are between 60 V and 1.5 kV.

An electrical drive unit 4, that is designed in the present case to drive a lifting mechanism 12 of a crane or of a cable excavator, is arranged in the high voltage onboard network 2. The drive unit 4 has an inverter 10 and a motor 11 and can furthermore also be provided with the sensor system required to control the motor. The drive unit 4 can furthermore be provided via a transmission that is disposed downstream and/or upstream of the motor and that multiplies the motor torque acting on the lifting mechanism.

The lifting mechanism 12 driven by the drive unit 4 comprises the components typical therefor such as a winch, cable controls, rollers, etc. and serves the raising and lowering of a load.

The energy for the drive of the electrical drive unit 4 is generated by the primary energy source 5 and is transferred via the high voltage onboard network 2. The primary energy source can here be a DC energy source, for example in the form of a fuel cell, of an internal combustion engine having an inverter or a chargeable high voltage battery.

A holding brake 8 for braking or holding the lifting mechanism 12 is furthermore provided in the high voltage onboard network so that a load raised by the lifting mechanism 12 can be stopped or held. The holding brake 8 can be a self-closing electrical, electromechanical, or electrohydraulic brake that is supplied with energy via the high voltage onboard network 2.

In addition to further consumers 14 arranged in the high voltage onboard network 2, a brake resistor 15 is present that serves the elimination of excess recovery energy that is e.g. generated on the lowering of the load by the drive unit and cannot be fed back into the primary energy source 5 and also does not find any further users in the device 1.

A high voltage onboard network energy buffer 9 such as is drawn with dashed lines in the high voltage onboard network 2 can furthermore optionally be provided. Such a short-term energy buffer 9 serves the short-term buffering of energy in the DC intermediate circuit and can be implemented by a supercap or by an intermediate circuit capacitor.

The low voltage onboard network 3 is furthermore connected via a DC/DC converter 7 to the high voltage onboard network 2 so that the components arranged in the low voltage onboard network 2 such as a low voltage rechargeable battery 6 or further low voltage consumers 13 can be supplied with energy from the primary energy source 5.

The DC/DC converter, that is a converter that converts from one DC voltage level to another DC voltage level, is accordingly configured to conduct energy from the high voltage onboard network 2 to the low voltage onboard network 3.

Since, in accordance with various embodiments of the present disclosure, the converter is a bidirectional DC/DC converter 7, an energy flow can also take place in the present case from the low voltage range 3 into the high voltage range 2 so that, on a failure of the primary energy source, components arranged in the high voltage range 2 can be supplied at least in the short term with energy from the low voltage rechargeable battery 6 arranged in the low voltage range 3.

On a failure of the primary DC energy source 5, the high voltage onboard network 2 and thus the electric lifting mechanism 12 and the holding brake 8 are supplied with energy from the low voltage onboard network 3, respectively from the low voltage battery 6, via the bidirectional DC/DC converter 7. This topology together with the brake resistor 8 enables an emergency lowering of the load or of the equipped at a reduced speed.

The power of the DC/DC converter 7 and the energy content of the low voltage battery 6 are considerably below the characteristic values of the high voltage battery 5. On the holding of the load, however, only the losses of the electrical drive system 4 have to be covered by the low voltage battery 6 and the DC/DC converter 7. Power peaks that occur here can be covered by the optional DC intermediate circuit energy buffer 9. The energy recovered by the lowering of the load is conducted in a small part back into the low voltage battery via the DC/DC converter 7 and the other part is eliminated in the brake resistor 15, i.e. is converted into heat or is stored in the optional energy buffer 9.

It must be emphasized that no additional components such as an emergency unit or an emergency battery are required for the emergency lowing operation. In preferred embodiments, only the DC/DC converter 7 has to be designed as bidirectional. Bidirectional means that the energy flow via the DC/DC converter 7 can take place from the high voltage onboard network 2 into the low voltage onboard network 3 and vice versa.

Figure 2:
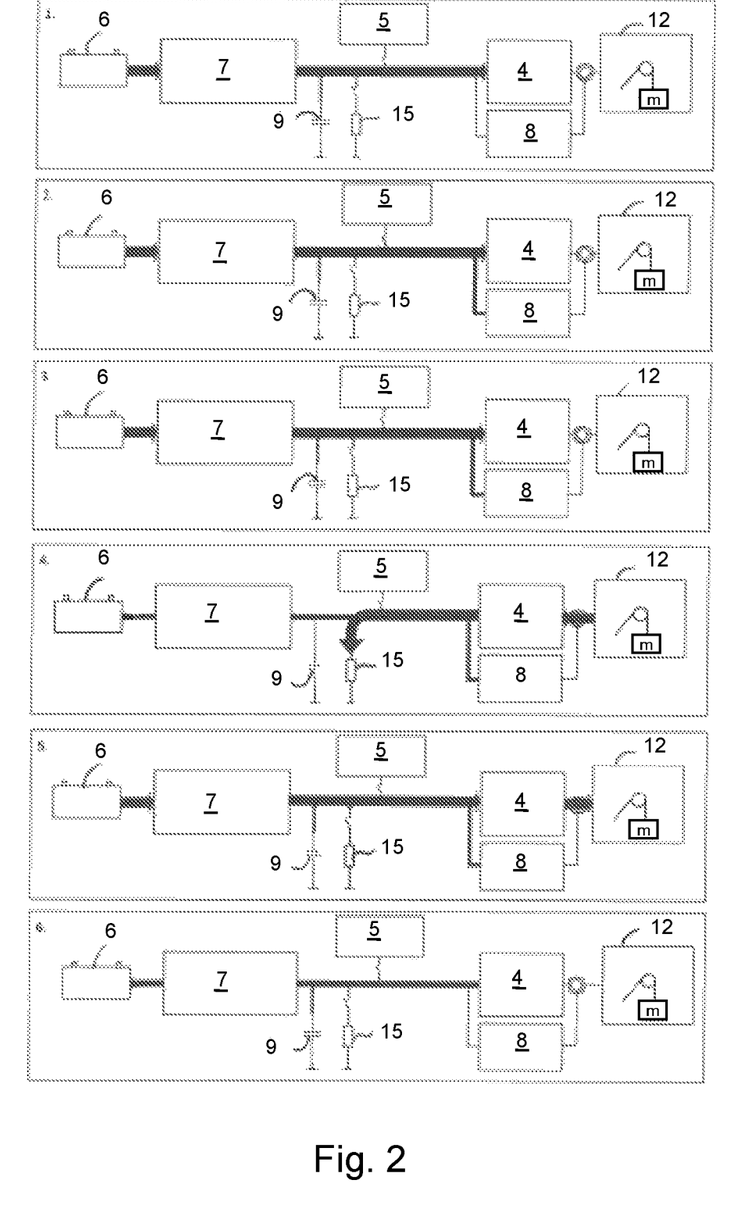
FIG. 2 shows energy flow between a low voltage onboard network and a high voltage onboard network on an emergency lowering of a crane or cable excavator, according to various embodiments.

FIG. 2 shows the energy flow during the routine control in emergency lowering operation of a crane or of a cable excavator. In this state, an energy supply by the primary energy source 5 is no longer possible; however, a controlled lowering of a raised load should nevertheless take place.

A holding torque is first built up in step 1 by means of the electrical drive unit 4. This is done with a closed holding brake 8. In this process, the inverter 10 controlling the motor 11 is supplied with energy via the DC/DC converter 7 and the low voltage battery 6, with possible power peaks being intercepted via the optional DC intermediate circuit energy buffer 9.

The energy flow is here drawn with bold arrows in the schematic basic design of the device 1 to make it easier to understand.

Once the corresponding holding torque has been built up by the electrical drive unit 4, the holding brake 8 is opened next in step 2. The holding brake 8 is supplied with energy from the low voltage battery 6 for this purpose.

Once the holding brake 8 has been opened, the drive unit 4 takes over the load torque so that no uncontrolled lowering of the load occurs. The holding brake 8 and the electrical lifting mechanism drive 4 are supplied with energy via the DC/DC converter 7 and the low voltage battery 6. Any power peaks are covered by the optional DC intermediate circuit energy buffer 9.

The load has to be held in the subsequent third step. The load is held by the electrical drive 4, with the holding brake 8 and the electrical drive 4 in the meantime being supplied with energy via the DC/DC converter 7 and the low voltage battery 6. Possible power peaks can again be cushioned via the optional DC intermediate circuit energy buffer 9 here.

In the fourth step, the load is lowered to the desired end position. By the lowering of the load from an elevated position in the direction of the ground, the drive unit can recover, that is can be set into its regenerative operating state in which energy is fed into the high voltage onboard network 2 by the lowering of the load. A smaller portion of the energy recovered by the lowering of the load is conducted via the DC/DC converter 7 into the low voltage battery 6 or directly into the high voltage energy buffer 5 (if it is not damaged and can take up energy). The large part is, however, eliminated with the aid of the brake resistor 15.

When the load approaches the desired lowered position, the holding brake 8 is closed and the brake 8 takes over the load torque on reaching the desired lowered position (cf. step 5). During the procedure, the holding brake 8 and the electrical drive 4 are supplied with energy via the low voltage rechargeable battery 6 and the DC/DC converter 7.

The holding torque of the motor now has to be reduced in step 6, which takes place in the sixth step. The motor torque is reduced for this purpose and possible excess energy due to the reduction of the motor torque is eliminated by internal losses, is stored in the high voltage buffer 9 or in the low voltage battery 6.

As a result, the load raised by the lifting mechanism has now been moved into a safe state close to the ground so that the desired emergency lowering has been successfully performed.

Figure 3:
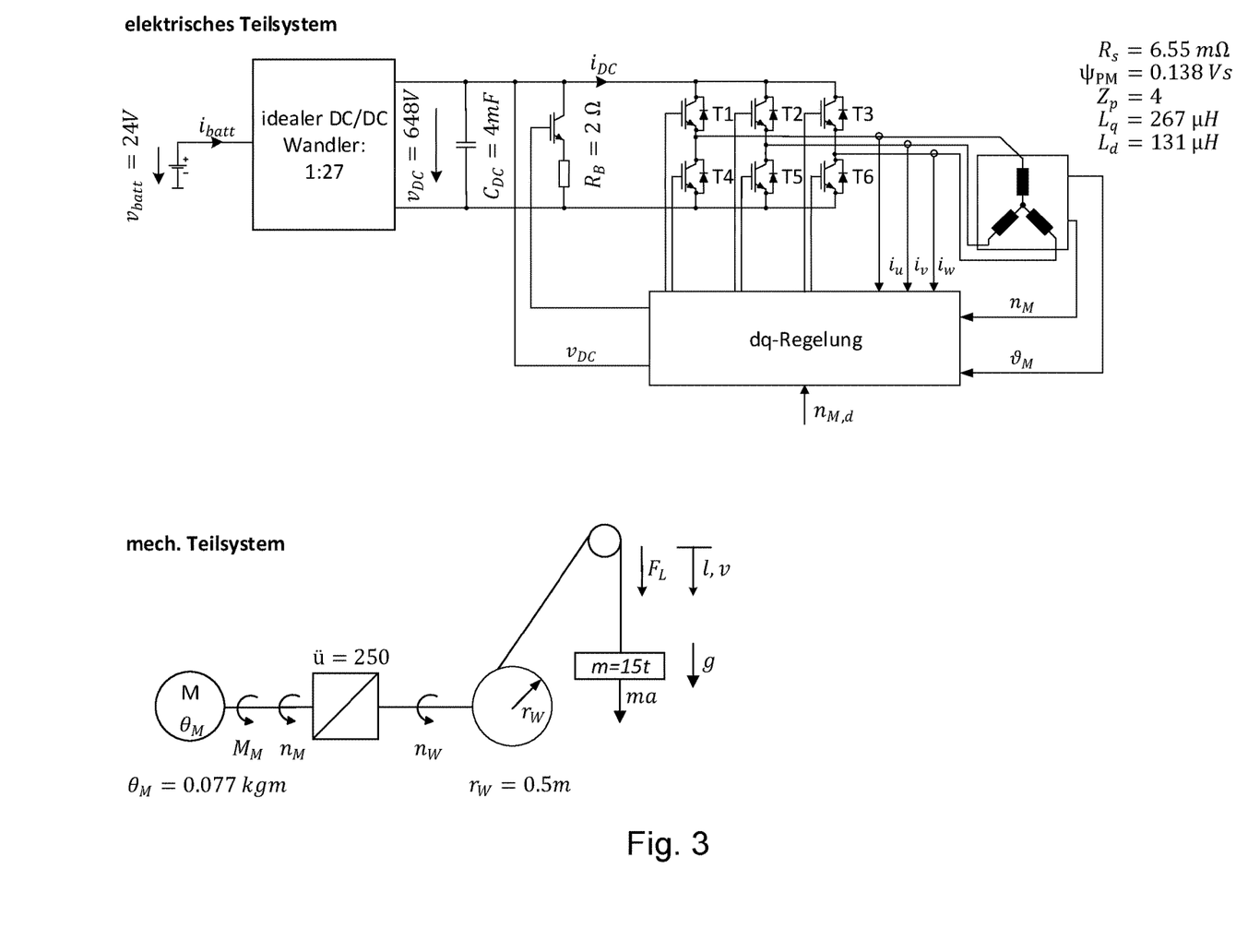
FIG. 3 is a block diagram of a simulation model with assumed parameters for an emergency lowering of a crane or cable excavator, according to various embodiments.

FIG. 3 shows a block diagram of a simulation model of the above-described application case of an emergency lowering of a crane or of a cable excavator having the characteristic parameters and the most important model parameters. The simulation model comprises an electrical part system and a mechanical part system. The electrical part system includes an ideal DC/DC converter 7 having the transmission ratio 1:27, a buffer capacity $C_{DC}$, a brake resistor $R_B$ with a switching element $T_1 \ldots T_6$, for example an IGBT, a MOSFET, or the like, a permanent synchronous motor, and a dq control. The mechanical part system comprises a moment of inertia of the motor $\theta_M$, an ideal transmission with the transmission ratio 1:250, and an ideal winch together with a load of $m_L$=15 t. It must be noted that in the present simplified simulation model, the DC/DC converter and the power electronics and the DC intermediate circuit were assumed to be loss-free and ideal and only the motor losses were considered by the parameters shown in FIG. 3. In addition, the holding brake was assumed as ideal, i.e. any power take-up was neglected.

Figure 4A:
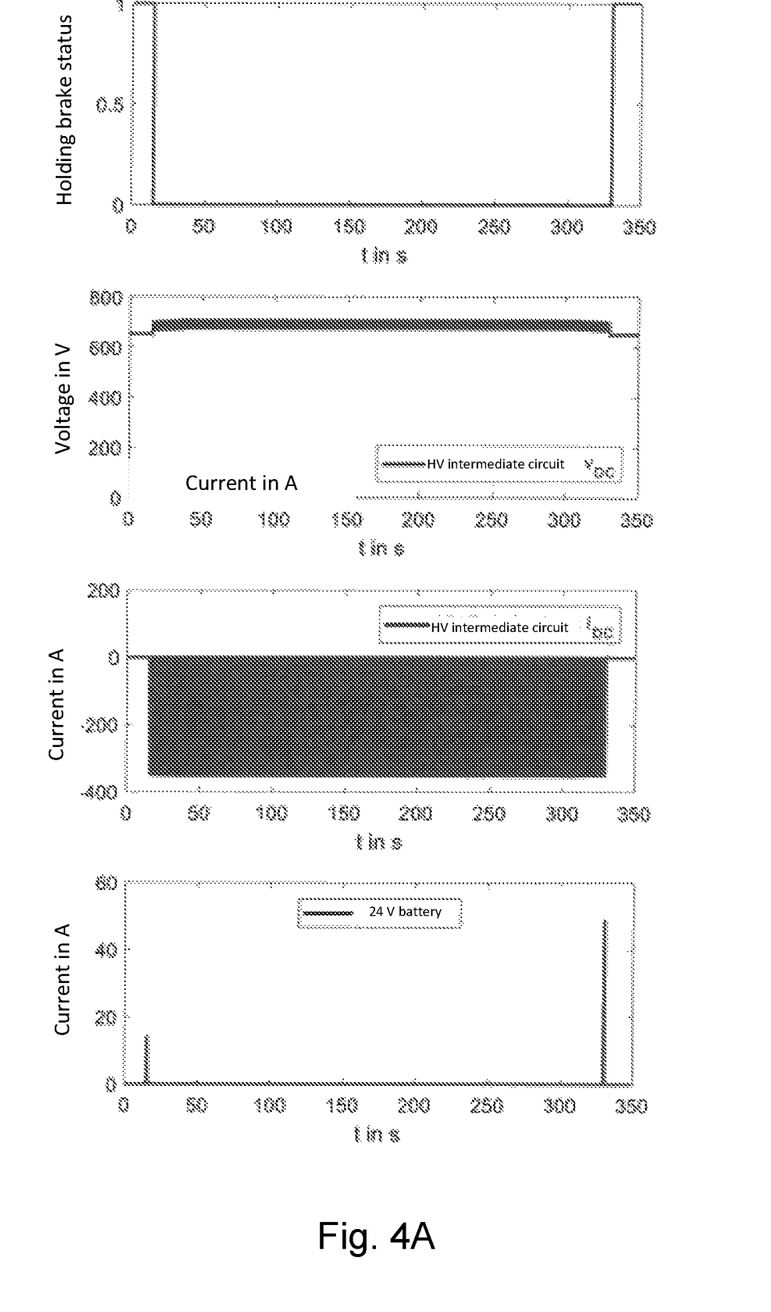
FIG. 4A shows simulation results on the carrying out of a simulated emergency lowering.
Figure 4B:
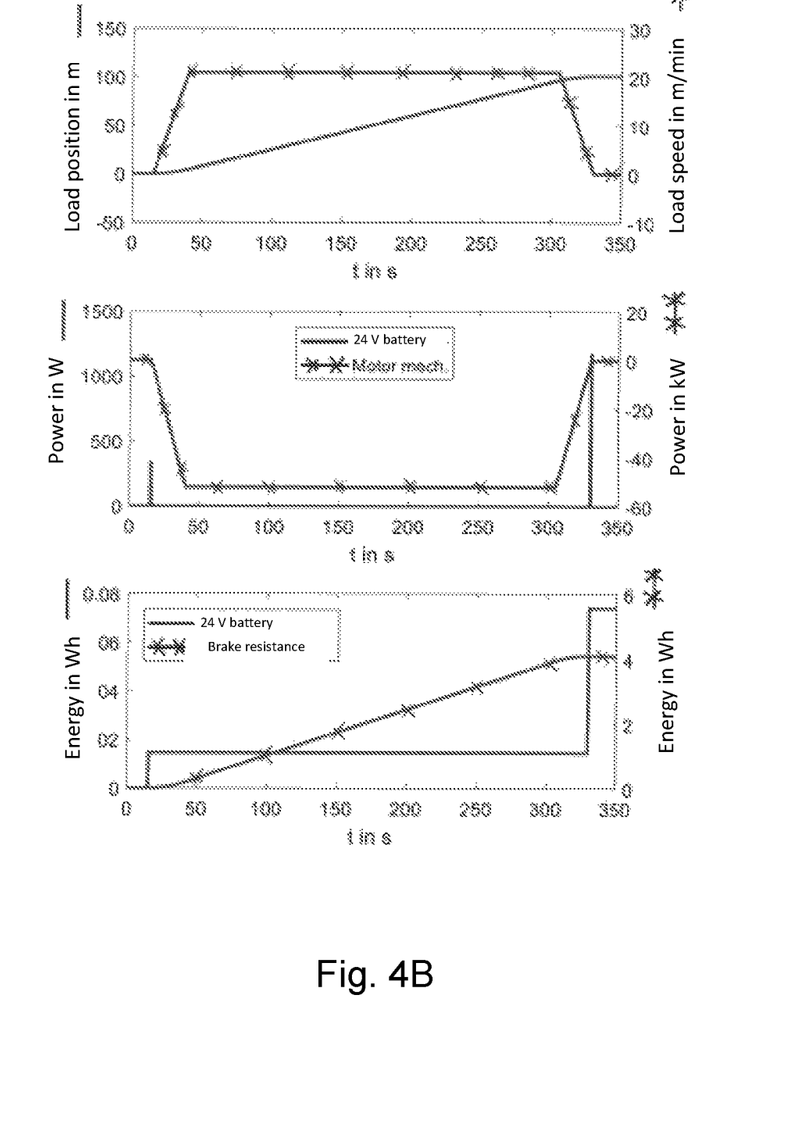
FIG. 4B shows further simulation results on the carrying out of the simulated emergency lowering.

Some simulation results are shown in FIGS. 4A and 4B. A load lowering from a height of approximately 100 m was simulated in the simulation scenario. The load is first held. From t=5 s, the load is accelerated to a speed of approximately 20 m/min at 4=40 s. Before reaching the end position at t=3300 s, the load is braked from t=305 s.

The status of the holding brake is also shown in the first diagram of FIG. 4A, with the value 1 standing for closed and the value 0 standing for open. In the stationary state of the load, the holding brake is closed and the brake is in its open position shortly before, during, and after the lowering of the load.

The voltage level that is applied to the DC/DC converter 7 in the high voltage onboard network and is called DC link voltage is shown in the illustration below it. On lowering the load, a voltage ripple can be seen between the nominal voltage at 648 V and the maximum DC link voltage. This ripple results from the recovery of the potential energy of the load in the DC intermediate circuit. The DC intermediate circuit voltage (or DC link voltage) is increased by the energy fed back. On reaching the maximum permitted DC link voltage, the brake resistor is switched in for so long until the nominal voltage has been reached.

The third illustration show an approximately pulse-shaped high voltage intermediate circuit current that results from the switching in of the brake resistor on reaching the maximum DC link voltage.

The bottommost illustration of FIG. 4A shows the current of the low voltage battery. It can be recognized that it is only loaded just before the opening and before the closing, for holding the load without a holding brake 8 (compensation of the losses).

The energy consumption is accordingly very low, which can also be recognized from the line continuously provided without crosses in the third illustration of FIG. 4B that indicates the energy of the low voltage battery 6 in Wh. It can generally be stated that the energy from the 24 V onboard network is considerably smaller than the energy fed back and the power and energy requirements are by all means in the range of the performance ability of a 12 V or 24 V battery used in crawler-type excavators and hydraulic cable excavators.

The first illustration of FIG. 4B shows the load position and the load speed. The load speed is drawn here by a line provided with crosses. It undergoes a linear acceleration from a position of rest due to the opening the brake and the starting recovery of the electric drive up to a maximum value of 20 m/min before it is braked by the motor after a certain time by the drive (approximately at t=300 s). The speed then slows and the load approaches the desired position as can be seen in this illustration from the continuous line.

The second illustration of FIG. 4B shows the discharge power of the low voltage battery (continuous line) and the mechanical power of the motor (continuous line with crosses). It can be recognized that the power from the low voltage battery is only required at the start and at the end of the emergency lowering procedure since sufficient energy for the interposed time period is generated by the recovery of the drive unit. The low voltage battery is only necessary to break out of the state of rest and to start the recovery or to continue to provide energy after or shortly before an ending of the recovery.

It can be seen from the third illustration of FIG. 4B, in addition to the small energy consumption from the low voltage battery, that the excess potential energy in the brake resistor 15 is converted into heat (cf. continuous line provided with crosses that indicates the energy of the brake resistor in kWh).

As shown by the simulation, the energy or power provided from the low voltage battery and via the DC/DC converter is sufficient to carry out an emergency lowering.

The power of the drive unit required to hold the load and the load required to cover the magnetization losses are provided via the DC/DC converter 7 and the low voltage battery 6. A required balance energy of the inverter 10 for controlling the motor 11 of the drive unit can be buffered in the intermediate circuit capacitor 9 or can also be obtained from the low voltage battery. The simulation shows that a controlled lowering of the load in an emergency operation is possible via the DC/DC converter 7 and the low voltage battery.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A device for an emergency supply of a high voltage onboard network for an emergency load lowering of a work machine, comprising:
   a high voltage onboard network having an electrical drive unit and a primary energy source for supplying the electrical drive unit with energy;
   a low voltage onboard network having a low voltage rechargeable battery for taking up and outputting energy; and
   a DC/DC converter that connects the high voltage onboard network and the low voltage onboard network to one another to permit an energy flow from the high voltage onboard network in the direction of the low voltage onboard network,
   wherein
   the DC/DC converter is a bidirectional DC/DC converter to permit an energy flow from the low voltage onboard network in the direction of the high voltage onboard network, wherein the device is adapted such that the low voltage rechargeable battery:
      in normal operation with a switched off primary energy source, supplies consumers that are arranged in the low voltage onboard network and serves the buffering of the low voltage onboard network with a switched in energy source; and
      in an emergency operation with a failed primary energy source, supplies both any consumers arranged in the low voltage onboard network and the electrical drive unit in the high voltage onboard network and/or an electrically actuable braking device arranged in the high voltage onboard network with energy.

2. The device in accordance with claim 1, wherein the device is adapted such that on a failure of the primary energy source in the high voltage onboard network, the emergency supply of the high voltage onboard network takes place by means of energy from the low voltage onboard network that comes from a low voltage battery via the bidirectional DC/DC converter.

3. The device in accordance with claim 1, wherein the high voltage onboard network is an onboard network that works with DC voltage in a range between 60 V to 1.5 kV.

4. The device in accordance with claim 1, wherein the low voltage onboard network is an onboard network that works with DC voltage of a maximum up to 60 V.

5. The device in accordance with claim 1, wherein an electrically actuable braking device is provided in the high voltage onboard network to brake and/or hold an axle drivable by the electrical drive unit, with the electrically actuable braking device being a holding brake that is adapted to hold the axle drivable by the electrical drive unit.

6. The device in accordance with claim 1, wherein a short-term energy store is provided in the high voltage onboard network, the short-term energy store comprising a supercap or an intermediate circuit capacitor adapted to carry out a short-term energy buffering in the high voltage onboard network.

7. The device in accordance with claim 1, wherein the device is adapted such that the DC/DC converter:
   supplies the low voltage onboard network with energy from the high voltage onboard network in normal operation; and
   supplies the high voltage onboard network with energy from the low voltage rechargeable battery of the low voltage onboard network in emergency operation that is present on a failure of the primary energy source.

8. The device in accordance with claim 1, wherein the electrical drive unit comprises an inverter and an electric motor that is connected to a transmission arrangement.

9. The device in accordance with claim 1, wherein the electrical drive unit is adapted to adopt a regenerative operating state in which the electrical drive unit does not drive, but is driven to feed energy into the high voltage onboard network.

10. The device in accordance with claim 5, wherein a lifting mechanism of a crane or of a cable excavator is arranged in the high voltage onboard network and can be actuated by means of the electrical drive unit and can be blocked by means of an electrically actuable braking device arranged in the high voltage onboard network.

11. The device in accordance with claim 10, wherein the electrically actuable braking device is an electrical or electrohydraulic holding brake for holding a load carried by the lifting mechanism in a stationary state and is to be supplied with energy via the high voltage onboard network for opening, with said holding brake being self-closing.

12. The device in accordance with claim 10, wherein the device is adapted such that, in emergency operation in which the primary energy source has failed, the holding brake is opened by means of energy from the low voltage rechargeable battery and the load carried by the lifting mechanism lowers so that the electrical drive unit thereby takes over a regenerative operating state in which the low voltage rechargeable battery is supplied with energy.

13. The device in accordance with claim 12, wherein the device is adapted such that, in emergency operation, the holding brake is closed by means of energy from the low voltage rechargeable battery and fixes the load carried by the lifting mechanism; or wherein the device is adapted such that the holding brake is self-locking or that it fixes the holding brake in the emergency operation.

14. A mobile work machine comprising the device in accordance with claim 1.

15. The mobile work machine of claim 14, wherein the work machine comprises a crane or a cable excavator.

16. The mobile work machine of claim 14, wherein the low voltage onboard network comprises a 12 V onboard network or a 24 V onboard network or a 48 V onboard network or an onboard network that works with DC voltage of a maximum of up to 60 V, and wherein the high voltage onboard network is an onboard network that works with DC voltage in a range between 60 V to 1.5 kV.

17. The mobile work machine of claim 15, wherein an electrically actuable braking device is provided in the high voltage onboard network to brake and/or hold an axle drivable by the electrical drive unit, with the electrically actuable braking device being a holding brake that is adapted to hold the axle drivable by the electrical drive unit, and wherein a lifting mechanism of the crane or of the cable excavator is arranged in the high voltage onboard network and can be actuated by means of the electrical drive unit and can be blocked by means of an electrically actuable braking device arranged in the high voltage onboard network.

18. The device of claim 1, wherein the work machine comprises a crane or a cable excavator.

19. The device of claim 1, wherein the low voltage onboard network comprises a 12 V onboard network or a 24 V onboard network or a 48 V onboard network.

20. A device for an emergency supply of a high voltage onboard network for an emergency load lowering of a work machine, comprising:
- a high voltage onboard network having an electrical drive unit and a primary energy source for supplying the electrical drive unit with energy;
- a low voltage onboard network having a low voltage rechargeable battery for taking up and outputting energy; and
- a DC/DC converter that connects the high voltage onboard network and the low voltage onboard network to one another to permit an energy flow from the high voltage onboard network in the direction of the low voltage onboard network, wherein the DC/DC converter is a bidirectional DC/DC converter to permit an energy flow from the low voltage onboard network in the direction of the high voltage onboard network, wherein the device is adapted such that, in emergency operation in which the primary energy source has failed, a holding brake is opened by means of energy from the low voltage rechargeable battery and a load carried by a lifting mechanism lowers so that the electrical drive unit thereby takes over a regenerative operating state in which the low voltage rechargeable battery is supplied with energy.

* * * * *